Jan. 21, 1947.  G. H. KAEMMERLING  2,414,743
JOINT
Filed July 8, 1943  2 Sheets-Sheet 1

Inventor
Gustav H. Kaemmerling
By M. R. Lord
Attorney

Jan. 21, 1947.  G. H. KAEMMERLING  2,414,743
JOINT
Filed July 8, 1943  2 Sheets-Sheet 2

Inventor
Gustav H Kaemmerling
By
H L Lord
Attorney

Patented Jan. 21, 1947

2,414,743

UNITED STATES PATENT OFFICE 2,414,743

JOINT

Gustav H. Kaemmerling, Erie, Pa., assignor to Lord Manufacturing Company, Erie, Pa., a corporation of Pennsylvania Application July 8, 1943, Serial No. 493,839

12 Claims. (Cl. 287—85)

The present invention relates to joints in which the joint action is accommodated by the distortion of an element of resilient material, such as rubber.

In carrying out the invention, the resilient element is secured by surface union, as bonding, to the members having relative movement. Where these members are annular and the resilient material is between the annular surfaces, the rubber is placed under initial tension. Under some stresses the rubber under compression is more desirable. This is usually true where the load is carried by a torsion action on the joint.

Where the joint is used for a mounting, the structure provides a simple means for varying the relative resistances in different directions as in some environments it is desirable to have these resistances greater or less in one direction with relation to another.

Features and details of the invention will appear from the specification and claims.

A preferred embodiment of the invention is illustrated in the accompanying drawings as follows:

Fig. 1 shows an end view of a unit of the joint.

Fig. 2 a section of one unit of the joint on the line 2—2 in Fig. 1.

Fig. 3 shows a completed joint in section on the line 2—2 in Fig. 1.

Fig. 4 a perspective view of the joint.

Fig. 5 a section on the line 5—5 in Fig. 3 showing the supported and supporting members in a torsion setup in which the joint is used.

Figs. 6 to 9 illustrate an alternative construction in which:

Fig. 6 shows an end view of a unit of the joint.

Figure 1:
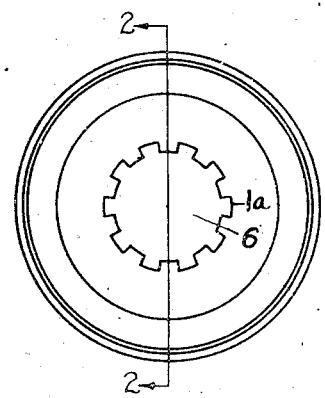
Figure 2:
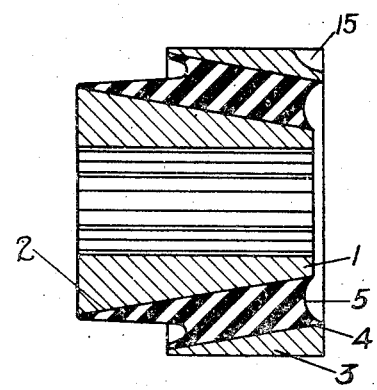
Figure 3:
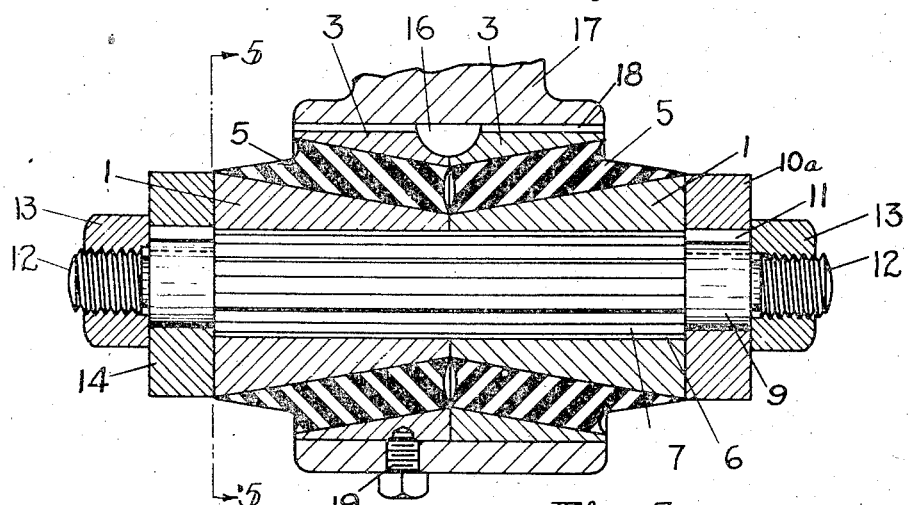
Figures 4, 5:
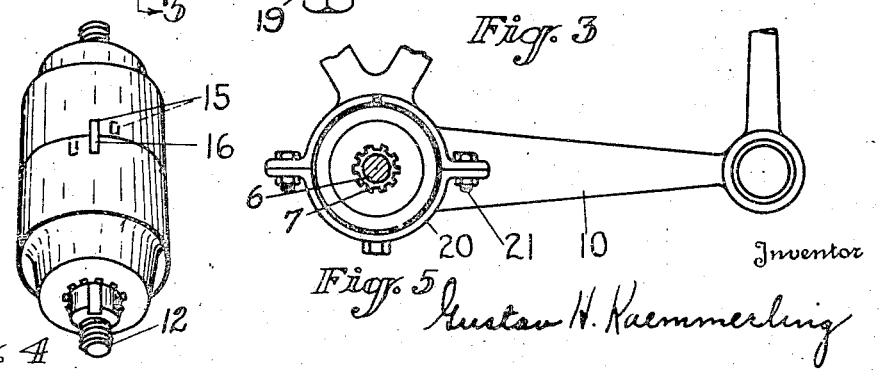
Figure 6:
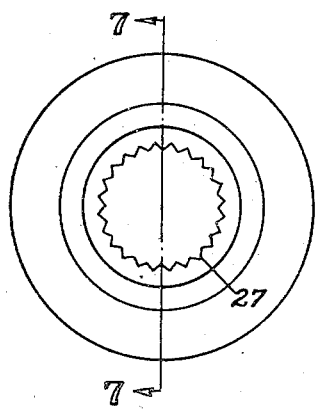
Figure 7:
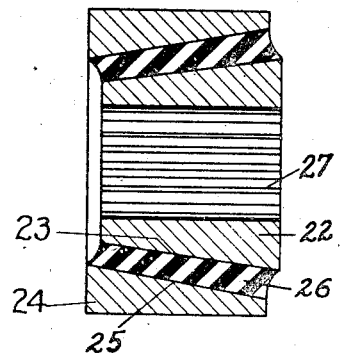

Fig. 7 a section on the line 7—7 in Fig. 6.

Figure 8:
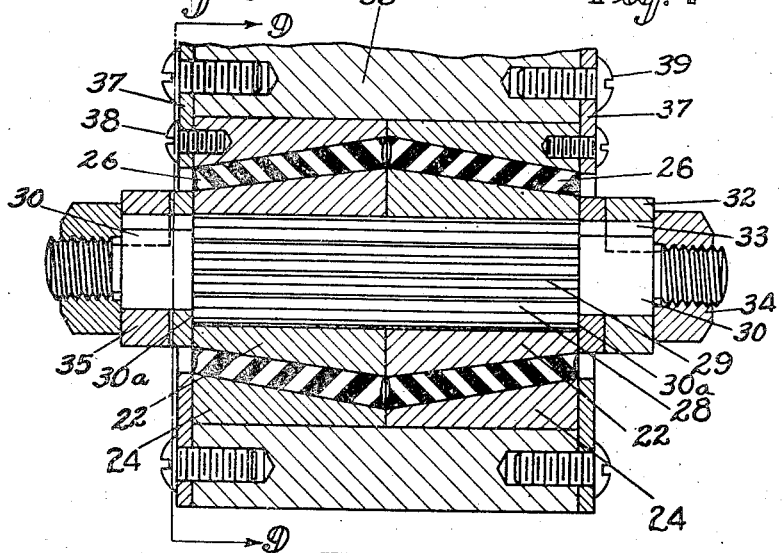

Fig. 8 a section of the completed joint on the line 7—7 in Fig. 6.

Figure 9:
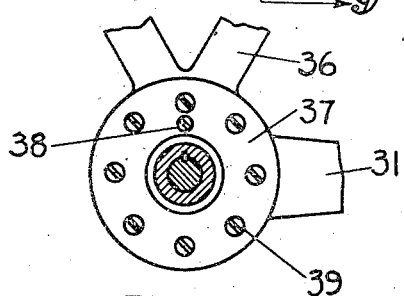

Fig. 9 a section on the line 9—9 in Fig. 8.

Figure 10:
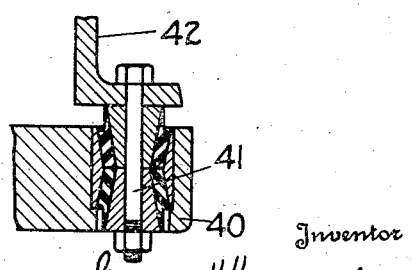

Fig. 10 shows an alternative construction, the view being a vertical section, in which the joint is used as a mounting and arranged in position for axial loading.

In the modification, Figs. 1 to 5, 1 marks an inner member of a unit of the joint, 2 a bevelled outer surface of that member, 3 an outer member of a unit of the joint, 4 a bevelled or conical surface on the inner surface of the outer member 3, 5 an element of resilient material, such as rubber, bonded to the opposing surfaces 2 and 4. Ordinarily this rubber as bonded is placed under tension by the shrinkage of the rubber.

The joint units are mounted on a supporting pin 6, this pin having key ribs 7 which are adapted to engage grooves 1a in the member 1. Two units are placed on the pin 6 with the bevelled surfaces opposed, and the inner members are drawn together. This is accomplished by providing reduced ends 9 for the ends of the pin on which a torsion supporting arm 10 is mounted, the torsion arm having a central ring or hub 10a sliding over the reduced portion, and is locked against rotation on the pin by a key 11. The outer end of the pin is threaded at 12 and a nut 13 tightens it up. The opposite end is provided with a ring portion 14 corresponding to the part 10a and may have a companion extending arm 10 or may simply be used as a clamping face for the joint. The nuts at the opposite end are screwed up and this forces the inner members of the units together as clearly shown in Fig. 3. This endwise movement brings the bevelled surfaces closer together and consequently puts the rubber under compression.

The outer members of the two units may be rotated relatively to each other, preferably in opposite directions. When rotated to an extent putting the rubber under torsional stress to the desired degree, they are locked in this torsionally adjusted position. To accomplish this the outer members have slots 15 which, as the members are rotated, may be brought into register and a key 16 dropped into the slot locking the two members relatively with the elements in opposing torsional stress. A supporting member 17 for the joint has a slot 18 permitting the introduction of the parts with the key 16 slightly extending from the members and locking the outer members relatively with the supporting member 17. These may be further locked by means of a set screw 19. Preferably the supporting member is in the form of a split ring 20, the parts of which are secured together by bolts 21.

In this structure it will be noted that the rubber element is under initial stress, specifically in this example under compression, and also torsional stress. Where the movement of the joint is past the neutral point of the rubber so that the stress on the rubber is reversed through this movement, the rubber element becomes fatigued more rapidly than where the stresses are confined to one side of neutral. Therefore, when this member is set up and the rubber is stressed each way from neutral, it is desirable that it be sufficiently stressed that the movement does not carry through the neutral position of the rubber. In other words, a movement toward neutral would decrease the stress in the rubber and a movement away from neutral would increase the stress in the rubber. This would be true both as to torsional and lengthwise stress.

In the modified structure, Figs. 6 to 9, each unit has an inner member 22 with a bevelled surface 23, an outer member 24 with a bevelled surface 25 and an interposed rubber element 26. The opening through the member 22 has serrations 27. A supporting pin 28 is provided with serrations 29 coacting with the serrations 27 to lock the inner members with the supporting pin. The pins have reduced ends 30 forming shoulders 30a and a torsion arm 31 extends from a hub 32 which is locked with the pin by a key 33. The ends of the pin are screw-threaded and provided with nuts 34. At one end of the pin the hub may be merely in the form of a ring 35 or a pair of torsion arms may be used if desired.

A supporting member 36 surrounds the outer member and end plates 37 engage the ends of the supporting member and the outer member. The units are forced together, thus bringing the ends of the outer members together. In this respect the direction of bevel is reversed from that in the preceding structure but the ultimate result is substantially the same.

In order to put the rubber under torsional stress, the plate 37 at one end is secured by screws 38 to the outer member of one of the units. The plate 37 is then rotated so far as may be necessary to create the stress between the members of that unit and then secured by screws 39 to the supporting member. The plate and screws at the opposite end operate in like manner but in reverse direction, thus putting the rubber in that unit under opposite stress. The operation in torsional action is substantially that of the modification shown in Figs. 1 to 5.

Another modification is illustrated in Fig. 10, in which the joint is set on a support 40 and a central pin 41 extends through the support and locks the joint in place thereon. A supported member 42 corresponds in structure to the outer torsion member 32 in the structure shown in Fig. 8. Here, as in the other joints, it may not be desirable to pre-stress the rubber torsionally, but the rubber may be put under compression and still maintain the double bond. By changing this bevel, the relative resistance to the joint in a vertical direction may be varied with relation to the radial resistance of the joint. In very many environments this is desirable.

Further, the bevel may be such as to give as near a direct shear movement as desired. Thus a mounting may be formed with slightly greater resistance than parallel surfaces but still maintain the general effect of a shear mounting.

What I claim as new is:

1. A joint comprising two units, each including members having opposing surfaces, and an element of resilient material, such as rubber, between the surfaces and secured thereto, the members of each unit being relatively movable through the distortion of the element, and means securing the members of one unit to the members of the companion unit with the members of each unit initially displaced relatively to each other and stressing through such relation the element in one unit in a direction opposing the stress of the element of the companion unit.

2. A joint comprising two units, each including members having opposing surfaces, and an element of resilient material, such as rubber, between the surfaces and secured thereto, the members of each unit being relatively movable through the distortion of the element, and means securing the members of one unit to the members of the companion unit with the members of each unit initially displaced relatively to each other and stressing through such relation the element in one unit in a direction opposing the stress of the element of the companion unit, the extent of offsetting of the surfaces of the members from a position neutralizing the stress of the included elements being greater in each unit than the normal movement of the joint members.

3. A joint comprising two units, each including members having annular opposing surfaces, the members being in axial alignment, and an element of resilient material, such as rubber, between the opposing surfaces and secured thereto, the members of each unit being relatively movable through the distortion of the element, and means securing the members of one unit to the members of the companion unit with the members of each unit initially displaced relatively to each other and stressing through such relation the element in one unit in a direction opposing the stress of the element of the companion unit.

4. A joint comprising two units, each including members having annular opposing surfaces, the members being in axial alignment, and an element of resilient material, such as rubber, between the opposing surfaces and secured thereto, the members of each unit being relatively movable through the distortion of the element, and means securing the members of one unit to the members of the companion unit with the members of each unit initially displaced relatively to each other and stressing through such relation the element in one unit in a direction opposing the stress of the element of the companion unit, the extent of offsetting of the surfaces of the members from a position neutralizing the stress of the included elements being greater in each unit than the normal movement of the joint members.

5. A joint comprising two units, each including members having opposing bevelled surfaces, the bevel of one unit having its inclination opposing the inclination of the companion unit, and an element of resilient material, such as rubber, between the surfaces and secured thereto, the members of each unit being relatively movable through the distortion of the element, and means securing the members of one unit to the members of the companion unit with the members of each unit initially displaced relatively to each other and stressing through such relation the element in one unit in the direction of the inclination of the bevels in the units, opposing the stress of the element of the companion unit.

6. A joint comprising two units, each including members having opposing bevelled surfaces, the bevel of one unit having its inclination opposing the inclination of the companion unit, and an element of resilient material, such as rubber, between the surfaces and secured thereto, the members of each unit being relatively movable through the distortion of the element, and means securing the members of one unit to the members of the companion unit with the members of each unit initially displaced relatively to each other and stressing through such relation the element in one unit in the direction of the inclination of the bevels in the units, opposing the stress of the element of the companion unit, the extent of offsetting of the surfaces of the members from a position neutralizing the stress of the included elements being greater in each unit than the normal movement of the joint members.

7. A joint comprising two units, each including conical members in axial alignment having opposing surfaces, the bevel of one unit having its inclination opposing the inclination of the companion unit, and an element of resilient material, such as rubber, between the surfaces and secured thereto, the members of each unit being relatively movable through the distortion of the element, and means securing the members of one unit to the members of the companion unit with the members of each unit initially displaced relatively to each other and stressing through such relation the element in one unit in a circumferential direction opposing the stress of the element of the companion unit.

8. A joint comprising two units, each including inner and outer conical members respectively disposed in axial alignment and having opposing surfaces, the bevel of one unit having its inclination opposing the inclination of the companion unit, and an element of resilient material, such as rubber, between the surfaces and secured thereto, the members of each unit being relatively movable through the distortion of the element, and means securing the members of one unit to the members of the companion unit with the members of each unit displaced relatively to each other and stressing through such relation the element in one unit in axial and circumferential directions opposing the stress of the element of the companion unit.

9. A joint comprising two units, each including conical members in axial alignment having opposing surfaces, the bevel of one unit having its inclination opposing the inclination of the companion unit, and an element of resilient material, such as rubber, between the surfaces and secured thereto, the members of each unit being relatively movable through the distortion of the element, means securing the members of one unit to the members of the companion unit with the members of each unit initially displaced relatively to each other and stressing through such relation the element in one unit in a circumferential direction opposing the stress of the element of the companion unit, and a torsion arm locked with one of the pairs of members.

10. A joint comprising two units, each comprising inner and outer conical members having their bevel surfaces opposingly placed and resilient elements such as rubber secured to said surfaces by surface union, a connecting bar, means locking the inner members together axially and against rotation on the bar, and devices locking the outer members relatively to each other and respectively initially rotatively offset with respect to the inner members.

11. A joint comprising two units, each comprising inner and outer conical members having their bevel surfaces opposingly placed and resilient elements such as rubber secured to said surfaces by surface union, a connecting bar, means locking the inner members together axially and against rotation on the bar, devices locking the outer members relatively to each other and respectively initially rotatively offset, and a torsion arm locked with one of the pairs of members.

12. A joint comprising two units, each including inner and outer conical members respectively disposed in axial alignment and having opposing surfaces, the bevel of one unit having its inclination opposing the inclination of the companion unit, and an element of resilient material such as rubber between the surfaces and secured thereto, and means holding the inner and outer members of one unit respectively in fixed relation to the corresponding members of the other unit with the members of each unit displaced relatively to each other in the direction to compress the rubber elements between the opposing surfaces.

GUSTAV H. KAEMMERLING.